United States Patent [19]
Van Der Zyl

[11] Patent Number: 4,696,122
[45] Date of Patent: Sep. 29, 1987

[54] FISHING ROD HOLDER/CARRIER

[76] Inventor: Jad D. Van Der Zyl, 1140 NE. 51st Ave., Des Moines, Iowa 50313

[21] Appl. No.: 23,573

[22] Filed: Mar. 9, 1987

[51] Int. Cl.⁴ ............................................. A01K 97/10
[52] U.S. Cl. .................................... 43/21.2; 211/70.8
[58] Field of Search ............... 43/21.1; 211/70.8, 70.6, 211/60.1

[56] References Cited

U.S. PATENT DOCUMENTS

| | | | |
|---|---|---|---|
| 767,101 | 8/1904 | Brown | 211/60.1 |
| 1,380,570 | 6/1921 | Lehman | 211/60.1 |
| 2,580,625 | 1/1952 | Waltz | 43/21.2 |
| 3,004,673 | 10/1961 | Emery | 211/70.8 |
| 3,487,947 | 1/1970 | Bogar | 211/70.8 |
| 3,674,190 | 7/1972 | Wright | 43/26 |
| 4,003,612 | 1/1977 | Munsell | 211/70.8 |
| 4,133,131 | 1/1979 | Davy | 43/21.2 |
| 4,311,262 | 1/1982 | Morin | 43/21.2 |
| 4,479,322 | 10/1984 | Koppel | 43/21.2 |
| 4,523,403 | 6/1985 | Ivy et al. | 43/21.2 |
| 4,529,112 | 7/1985 | Miller | 43/21.2 |
| 4,531,644 | 7/1985 | Margulies | 211/60.1 |
| 4,582,203 | 4/1986 | Davis | 211/60.1 |
| 4,628,628 | 12/1986 | Burgin et al. | 43/26 |

OTHER PUBLICATIONS

Brochure on Rod Tote, Sully Manufacturing, P.O. box 84, Sully, IA 50251.

Primary Examiner—Gene P. Crosby
Attorney, Agent, or Firm—Henderson & Sturm

[57] ABSTRACT

An apparatus for holding fishing rod and reel outfits including a frame with a first clip attached to the frame for holding a lower portion of the fishing rod and a second clip attached to the frame for holding an upper portion of a fishing rod. A first support is attached to one end of the frame and a second support is attached to the other end of the frame. A first pair of substantially parallel legs are operatively attached, one to each end of the first support. The first pair of legs are transversely disposed with respect to the length of the frame. A second pair of substantially parallel legs are operatively attached, one to each end of the second support. This second pair of legs is also generally transversely disposed with respect to the length of the frame whereby the first and second pair of legs permit the apparatus to be placed on the floor or a boat, recreational vehicle, car trunk, truck bed, or a house without the rod and reel combinations coming in contact with such floor.

10 Claims, 11 Drawing Figures

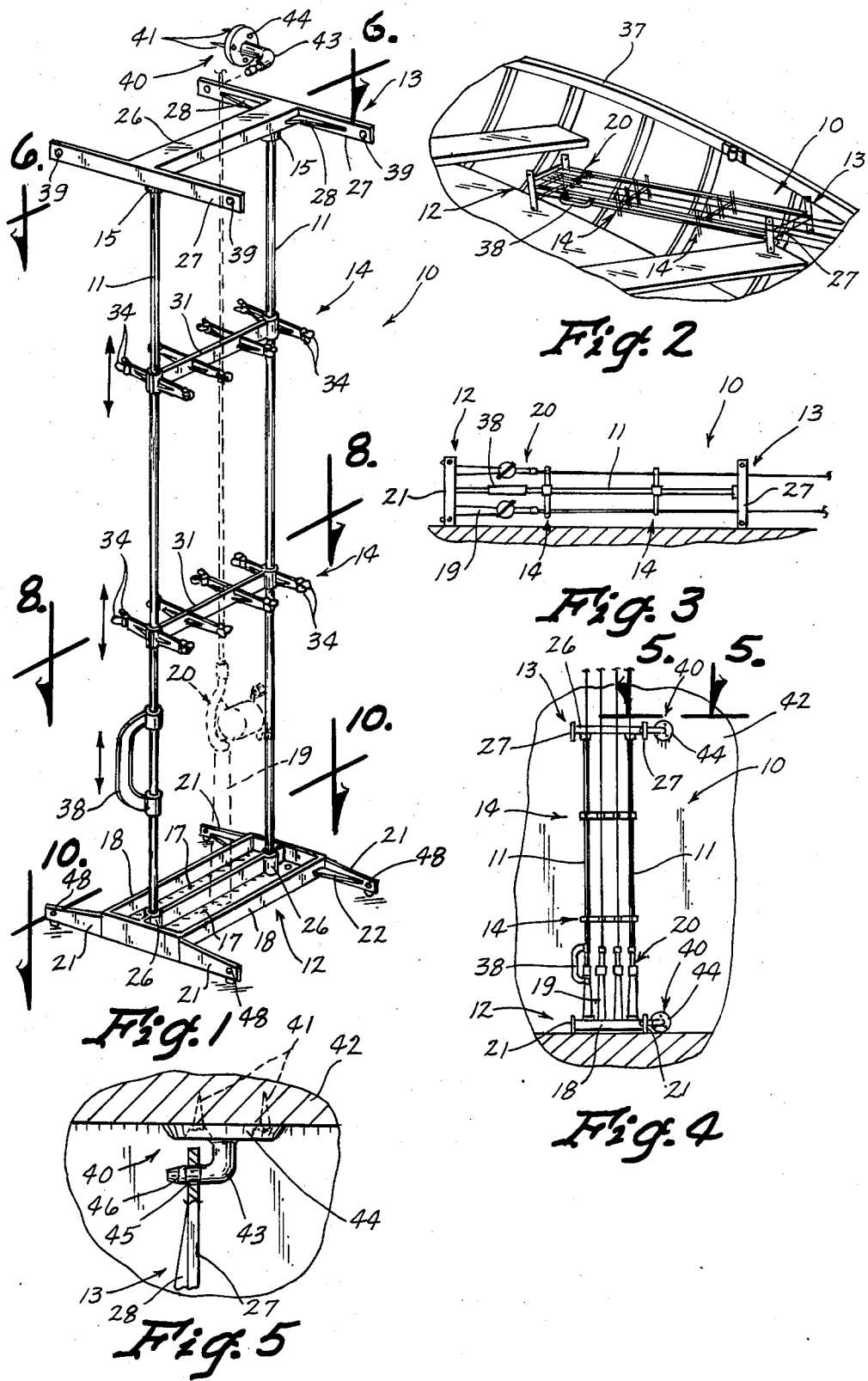

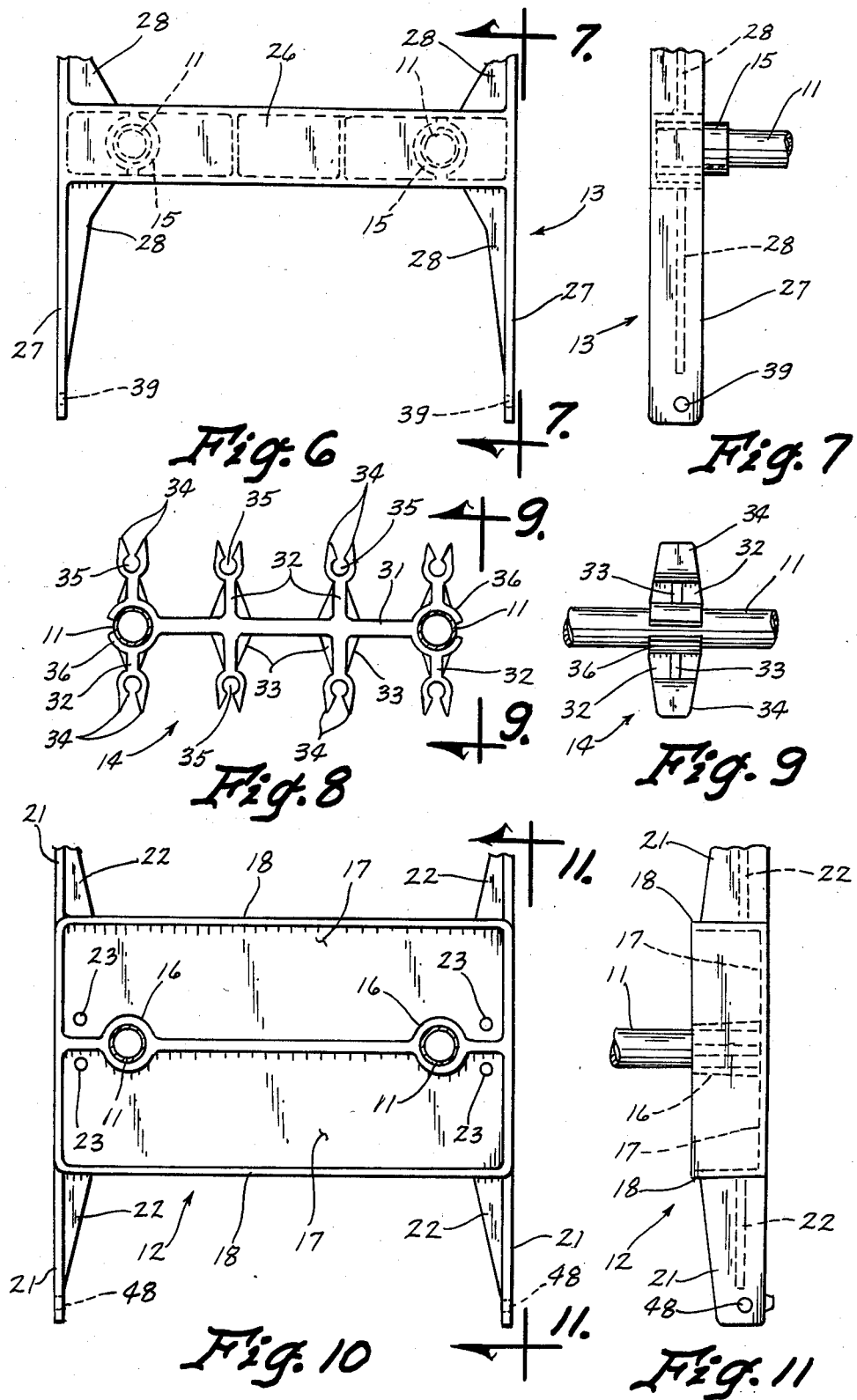

FISHING ROD HOLDER/CARRIER

TECHNICAL FIELD

The present invention relates generally to fishing pole holders and more particularly to a fishing pole holder which will carry several fishing poles with reels attached thereto and structure making it convenient to carry such poles from place to place and also to easily and quickly store them away when not in use.

BACKGROUND ART

Fishermen often take several rods with reels attached thereto with them when they go fishing. This can be for the purpose of providing a fishing pole outfit for each person in the fishing party, but quite often it is for the purpose of having different rod and reel combinations available for different fishing conditions, or, as in the case of a tournament fisherman, for quickly switching from one lure to another by merely grabbing a different rod and reel outfit.

These rod and reel combinations need to be stored in a home, in a vehicle and in a boat, and they also need to be transported between such destinations.

U.S. Pat. No. Des. 256,303 to Rieman shows an apparatus for holding several rod and reel combinations for carrying them from place to place. A major disadvantage of the Rieman structure is that it only holds four poles and it is somewhat difficult to store with the rod and reels attached thereto without the reels coming in contact with a moving object such as a vehicle or boat, thereby sometimes damaging the rod and reel combinations. U.S. Pat. No. 4,628,628 to Burgin et al holds several fishing rods and reels but when placed on a floor in a boat, trunk, house, or the like, the reels themselves will come into direct contact with such floor and can thereby be damaged.

U.S. Pat. No. 3,674,190 to Wright shows a carrier for rods with reels attached thereto, but a major disadvantage of this structure is that the rod and reel combinations are not easily and quickly accessible when in use in a boat.

U.S. Pat. No. 4,311,262 to Morin shows a rod and reel holder which must remain substantially in a vertical position for the rods and reels to be properly stored and is not practical for use in a boat or the like.

DISCLOSURE OF THE INVENTION

The present invention relates to an apparatus for holding fishing rod and reel outfits and includes a frame with a first clip attached to the frame for holding a lower portion of the fishing rod and a second clip attached to the frame for holding an upper portion of a fishing rod.

A first support is attached to one end of the frame and a second support is attached to the other end of the frame. A first pair of substantially parallel legs are operatively attached, one to each end of the first support. The first pair of legs are transversely disposed with respect to the length of the frame. A second pair of substantially parallel legs are operatively attached, one to each end of the second support. This second pair of legs is also generally transversely disposed with respect to the length of the frame whereby the first and second pair of legs permit the apparatus to be placed on the floor of a boat, recreational vehicle, car trunk, truck bed; or a house without the rod and reel combinations coming in contact with such floor.

An object of the present invention is to provide a safe, convenient, one-handed way to carry a large number of rods with reels attached thereto.

Another object of the present invention is to provide a rod and reel carrier/holder which prevents damage to the rod and reel combinations and prevents tangling of line attached thereto.

Another object is to provide a compact and secure way to transport expensive rod and reel combinations.

A further object of the present invention is to provide an attractive, easy and free-standing apparatus for displaying rod and reel combinations.

A still further object of the present invention is to provide an apparatus for keeping rods and reels secure and organized in a vehicle or boat.

A still further object of the present invention is to provide a rod and reel carrier for a plurality of rod and reel combinations which is easy to carry but yet can be used to store rods and reels in a horizontal or vertical position or at any angle in between and still protect the rod and reel combinations from damage or tangling.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a fishing rod and reel holder/carrier shown in a vertical position with one fishing rod and reel combination shown in dashed lines and also showing how a clip can be utilized to prevent the holder/carrier from being easily tipped over;

FIG. 2 is a perspective view of the apparatus shown in use in a boat to illustrate how the rod and reel combinations are prevented from coming into contact with the boat itself;

FIG. 3 is a side elevational view of the present invention showing it in use to store rod and reel combinations in a horizontal position;

FIG. 4 is a side elevational view showing the present invention in a vertical storage position as it might appear in a home, recreational vehicle, houseboat, or the like;

FIG. 5 is an enlarged partial cross-sectional view taken along line 5—5 of FIG. 4;

FIG. 6 is a view taken along 6—6 of FIG. 1;

FIG. 7 is a view taken along 7—7 of FIG. 6;

FIG. 8 is a cross-sectional view taken along line 8—8 of FIG. 1;

FIG. 9 is a view taken along line 9—9 of FIG. 8;

FIG. 10 is a cross-sectional view taken along line 10—10 of FIG. 1; and

FIG. 11 is a view taken along line 11—11 of FIG. 10.

BEST MODE FOR CARRYING OUT THE INVENTION

Referring now to the drawings wherein like reference numerals designate identical or corresponding parts throughout the several views, FIG. 1 shows a preferred embodiment (10) of a fishing rod and reel holder/carrier constructed in accordance with the present invention. The apparatus (10) includes a pair of tubular shafts (11) which generally comprise a frame. A first support structure (12) is attached to the bottom of the tubular shafts (11) and a second support (13) is attached to the top of the tubular shafts (11). A pair of clip structures (14) are also attached to the tubular shafts (11) in the position shown in FIG. 1.

Referring to FIG. 10, it is noted that the bottom support (12) includes tubular portions (16) for receiving the bottom ends of the tubular shafts (11), such as in a frictional fit, although it is also possible to add fasteners or adhesive to connect the shafts (11) with the tubular portion (16). The support (12) also includes a pair of trays having a bottom (17) and walls (18) for holding the bottom of the handle (19) of a fishing rod and reel combination (20), for example as shown in dashed lines in FIG. 1. A pair of parallel legs (21) have braces (22) attached thereto and the function of these parallel legs (21) will be discussed below. Preferably, the support structures (12) are molded of one piece plastic, although they can obviously be made in other ways. Holes (23) are provided in the floor (17) of the support structure (12) for permitting water to drain when the structure is in use in a vertical position, for example as shown in FIGS. 1 and 4.

Referring now to FIG. 6, it is noted that the supports (13) have tubular members (15) for frictionally and telescopically engaging the tubular shafts (11). As with respect to tubular member (16) on supports (12), the relative size of the opening in the tubular member (15) is such as to frictionally hold the shaft (11) therein but would permit the support (13) to be pulled off if desired. Alternatively, fasteners or adhesive can be used in this joint if desired. A central portion (26) of support (13) has parallel legs (27) attached thereto and brace portions (28) connect the parallel legs (27) to the base portion (26). Preferably, the support (13) is molded of one-piece plastic, although other constructions are possible within the scope of the present invention.

Referring now to FIGS. 8 and 9, it is noted that the clip structures (14) have a central portion (31) with a plurality of outwardly extending arms (32) thereon supported by support flanges (33). The outward end of each arm (32) has a clip portion (34) thereon. The entire clip apparatus (14) is molded in one piece of a plastic material which permits the clip portions (34) to be bent apart by pushing a fishing rod into the opening (35) whereupon the resilient arms (34) will snap back and hold the fishing rod in place until such time that the fishing rod is pulled out of the opening (35) by reverse process.

The end portions (36) of the clip structure (14) frictionally engages the tubular members (11) so that the clip supports (14) will not slide up and down the tubular shafts (11) unless a great deal of pressure is brought to bear upon them. By pushing or pulling on them very hard, the relative position of the clip structures (14) can be changed to adjust to the particular rod and reel combinations to be used. Similarly, a handle (38) as shown in FIG. 1, frictionally engages one of the shafts (11) and is generally held in place in the position shown in FIG. 1, but by exerting an extra force on the handle (38) while grasping one of the tubular shafts (11), the handle (38) can be adjusted on the tubular shaft (11) between the lower clip structure (14) and the base support (12). This allows the carrier to be balanced during transport depending upon the particular combination of rod and reels being transported at such time.

Referring to FIG. 5, it is noted that an attachment clip (40) is shown attached by screws (41) to a support surface (42). This attachment clip (40) includes an L-shaped arm (43) rigidly connected to a base (44). An L-shaped arm (43) has a recess (45) and a flange (46) thereon. This clip structure (40) can be attached to a wall (42), for example as shown in FIG. 4 wherein the wall (42) could be in a home, in a recreational vehicle, in a houseboat, or at any other place. The clips (40) snap through openings (48) in the legs (21) of support (12) or through openings (39) in legs (27) of support (13). These clip structures (40) can be placed at the desired position for storage on any vehicle, boat or dwelling to hold the apparatus (10) in such desired position. For example, looking to FIG. 2, clips could be added to the boat (37) to hold the apparatus (10) in the position shown in FIG. 2. Clip structures (40) could be added to the ceiling of a houseboat or recreational vehicle to hold the apparatus (10) to the ceiling, and the places where the apparatus (10) can be stored by use of clips (40) is limited only to the imagination of the user.

Accordingly, it will be appreciated that the preferred embodiment (10) does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. Apparatus for holding fishing poles comprising:
   a first shaft having a first longitudinal axis;
   a second shaft having a second longitudinal axis disposed substantially parallel to said first longitudinal axis;
   first clip means attached to one end thereof to said first shaft and at the other end thereof to said second shaft for holding a lower portion of a fishing rod;
   second clip means attached at one end thereof to said first shaft and at the other end thereof to said second shaft for holding an upper portion of a fishing rod, said second clip means being spaced from said first clip means;
   first support means attached to one end of said first and second shafts;
   second support means attached to the other end of said first and second shafts;
   a first pair of substantially parallel legs operatively attached, one to each end of said first support means, said first pair of substantially parallel legs being transversely disposed with respect to said first and second longitudinal axes of said first and second shafts; and
   a second pair of substantially parallel legs operatively attached, one to each end of said second support means, said second pair of legs being generally transversely disposed with respect to said first and second longitudinal axes of said first and second shafts.

2. The apparatus of claim 1 wherein said first clip means includes a base portion having a first set of clips extending in opposite directions therefrom and said second clip means includes a base portion having a second set of clips extending in opposite directions therefrom.

3. The apparatus of claim 2 wherein said first and second pair of legs extend farther outwardly from said first and second longitudinal axes of said first and second shafts than any of said first and second set of clips whereby said apparatus can be supported on a floor on said first and second pair of legs to hold rods and reels held by said first and second set of clips up off of such floor.

4. The apparatus of claim 3 including tray means attached to said first support means for abutment with the bottom of the handle of fishing poles being held by said first and second set of clips.

5. The apparatus of claim 1 including means for adjusting the position of said first clip means along said first and second shafts.

6. The apparatus of claim 5 including means for adjusting the position of said second clip means along said first and second shafts.

7. The apparatus of claim 1 including a handle adjustably and slideably attached to said first shaft at a position between said first support means and said first clip means.

8. The apparatus of claim 3 including an opening in each end of each of said first and second pair of legs and means for selective attachment into one of said openings and for attachment to another object.

9. The apparatus of claim 8 wherein said object is a house, boat, vehicle or recreational vehicle.

10. Apparatus for holding fishing poles comprising:
a frame having a length longer than the width thereof;
a first clip means attached to said frame for holding a lower portion of a fishing rod;
second clip means attached to said frame for holding an upper portion of a fishing rod, said second clip means being spaced from said first clip means;
first support means attached to one end of said frame;
second support means attached to the other end of said frame;
a first pair of substantially parallel legs operatively attached, one to each end of said first support means, said first pair of substantially parallel legs being transversely disposed with respect to the length of said frame; and
a second pair of substantially parallel legs operatively attached, one to each end of said second support means, said second pair of legs being generally transversely disposed with respect to the length of said frame.

* * * * *